UNITED STATES PATENT OFFICE.

RUDOLF LINKMEYER, OF BRUSSELS, BELGIUM.

MANUFACTURE OF SILK-LIKE THREADS.

No. 857,640.

Specification of Letters Patent.

Patented June 25, 1907.

Application filed March 22, 1906. Serial No. 307,405.

*To all whom it may concern:*

Be it known that I, RUDOLF LINKMEYER, a subject of the Emperor of Germany, residing at Brussels, Belgium, have invented new and useful Improvements in the Manufacture of Silk-Like Threads, of which the following is a specification.

In accordance with the process that forms the subject of my application for Letters Patent Serial No. 24798, decomposition of the threads obtained by cupro-ammoniacal solutions of cellulose passed through capillary openings into solutions of fixed salts or alkalies is avoided and their strength increased, and the subsequent elimination of the copper that they still contain is facilitated by eliminating the free ammonia of these threads on leaving the precipitation bath by the action of air before subjecting them to washing by dilute acids.

Instead of air, steam may be used or gases suitable for converting the oxid of copper into carbonate such as carbonic acid but it has been found that the best results are obtained by employing, for the elimination of the ammonia, solutions of salts that absorb ammonia and are capable of forming at the same time with the oxid of copper contained in the threads, combinations readily soluble in acids, such for example as solutions of carbonate of soda or potash, chromates, phosphates, oxalates, borates, iodids and so on. In the same way as in treatment by air or steam or gases, the threads, on leaving the precipitation bath may be wound upon a perforated cylinder arranged in such a manner as to permit of filtration from the outside to the inside and vice-versa of solutions adapted to form with the oxid of copper combinations which are readily soluble in acids but insoluble in water and at the same time capable of eliminating the ammonia.

What I claim as my invention and desire to secure by Letters Patent is:

1. In the manufacture of silk like threads by precipitation of cellulose in alkaline solutions, subjecting the threads, on leaving the precipitation bath, to the action of an ammonia absorber suitable for forming with the oxid of copper in the threads combinations readily soluble in acids but insoluble in water, and subsequently washing the threads with diluted acids.

2. In the manufacture of silk like threads by precipitation of cellulose in alkaline solutions, subjecting the threads, on leaving the precipitation bath, by winding said threads to permit of filtration from the outside to the inside and vice versa, to the action of an ammonia absorbent and at the same time forming, with the oxid of copper contained in the threads, combinations readily soluble in acids but insoluble in water, and subsequently washing the threads with diluted acids.

3. In the manufacture of silk like threads by precipitation of cellulose in alkaline solutions, treating the threads, on leaving the precipitation bath with a solution of carbonate of soda, and subsequently washing the threads with diluted acids.

In testimony whereof I have affixed my signature in presence of two subscribing witnesses.

RUDOLF LINKMEYER.

Witnesses:
H. J. E. KIRKPATRICK,
A. I. VOGEL.